United States Patent Office 2,740,082
Patented Mar. 27, 1956

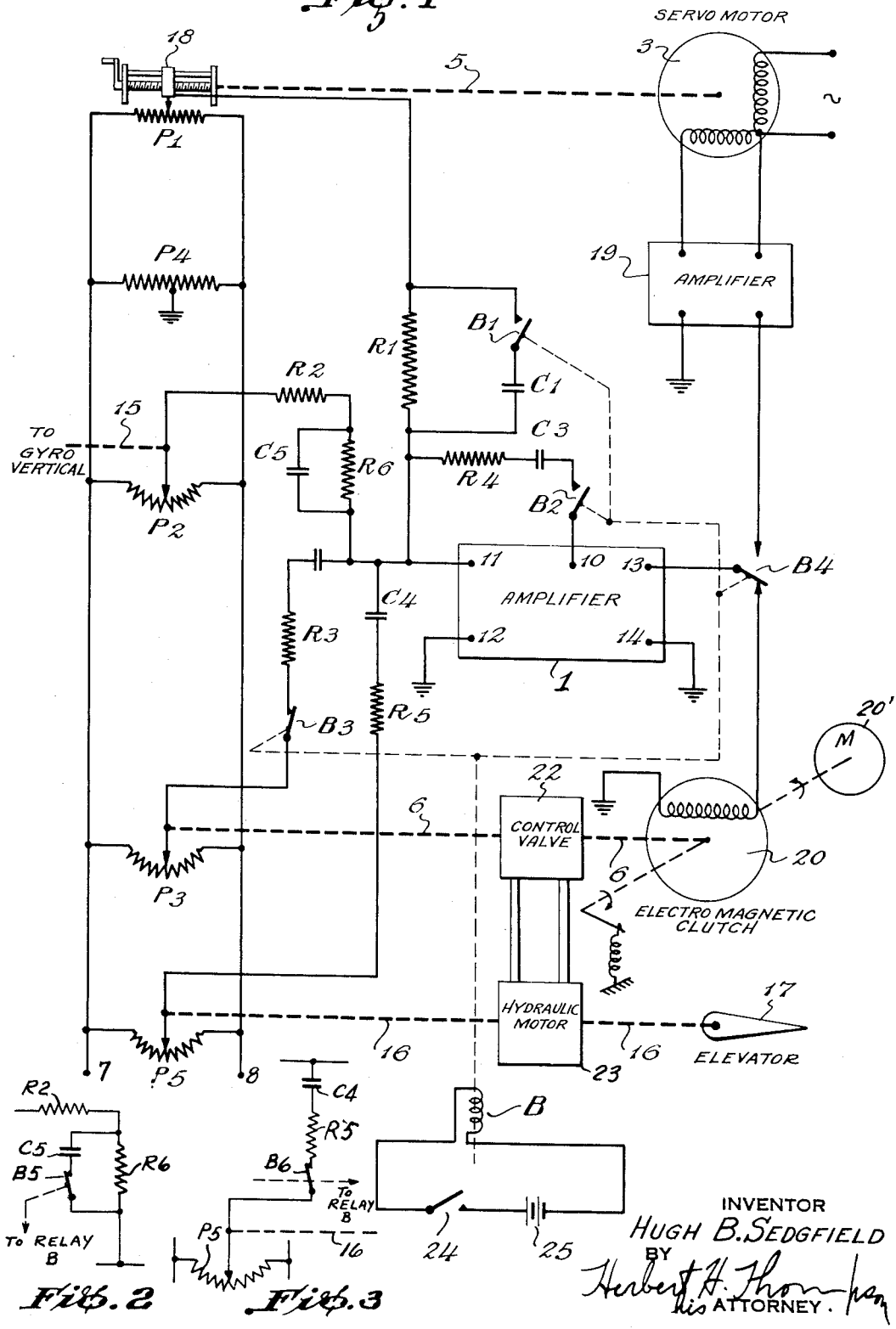

2,740,082

SERVO SYSTEMS

Hugh Brougham Sedgfield, Oakfield, Hampton, England, assignor, by mesne assignments, to The Sperry Gyroscope Company, Limited, Brentford, England, a British company Application September 11, 1952, Serial No. 309,026

3 Claims. (Cl. 318—489)

This invention relates to servo systems and, while not so restricted, is particularly applicable to servo systems employed for operating the various control surfaces of aircraft and to automatic pilot equipment for aircraft.

In servo systems of the kind with which the invention is concerned a servomotor is employed for automatically causing a variable to assume a value corresponding to a set input value, the servomotor being controlled in accordance with the difference between two primary control terms, of which one is a measure of the said input value and the other is a measure of the variable to be controlled. The variable that is to be controlled may be the speed of a body or vehicle, or its attitude measured as the angle it makes in a certain plane with a reference direction, e. g., the pitch angle of an aircraft. The measure of the variable may be provided by an instrument, e. g., in the case where the variable is the pitch angle of an aircraft, a gyro-vertical. The measure of the set input value may be provided by a primary controller, which acts to supply a control term to the servomotor. Alternatively, the primary controller may act to apply a control term to the instrument that measures the variable to alter the zero setting of the instrument in such a way that its output becomes a measure not of the value of the variable but of the difference between the value of the variable and the set input value.

In addition to the primary control terms, the servomotor may also be controlled in dependence on one or more secondary control terms, the purpose of which is, broadly, to improve the stability and accuracy of the servo system.

In many cases the variable may be capable of being controlled by means other than the servo system. For instance, in the case of an aircraft normally controlled by an automatic pilot it may be desirable, at times, to operate the various control surfaces directly from the pilot's controls. After such direct operation it is desirable that when automatic control is resumed the set input value should not differ greatly from the value of the variable in order that there may be no violent change in the value of the variable, following this resumption of automatic control.

To achieve this result, servo systems have been designed to be capable of inverted operation when in their stand-by condition: in other words, the system is designed, when in the stand-by condition, to operate to reduce the difference between the value of the variable and the set input value by varying the setting of the primary controller to control the set input value to match the value of the variable then obtaining instead of by varying the value of the variable to match the set input value.

Known systems of the kind referred to in the preceding paragraph are liable to be unstable and possibly inaccurate when connected for inverted operation. Consequently the object of the present invention is to provide a servo system which is capable of stable and accurate operation in the inverted condition as well as in the normal condition.

Accordingly, the invention consists in a servo system of the kind which normally operates to reduce the difference between the value of a variable and a set input value by controlling the variable (normal operation), and which is also capable of operating to reduce the said difference by controlling the set input value (inverted operation), wherein the control exercised by the system is modified during inverted operation in dependence on a time function of the set input value.

The invention also consists in a servo system of the kind referred to in the preceding paragraph, wherein the control exercised by the system is modified during inverted operation in dependence on the rate of change of the set input value.

Fig. 1 of the accompanying diagrammatic drawing shows one embodiment of the invention as applied to a servo system for controlling the pitch angle of an aircraft by means of the elevator in accordance with the setting of the pilot's controller and Figs. 2 and 3 illustrate modifications of this embodiment.

The servo system shown in the drawing is capable of normal or inverted operation, that is to say, it is capable of operating to cause the actual pitch angle of the aircraft to correspond to the setting of the pilot's controller (normal operation), or alternatively to cause the setting of the pilot's controller to correspond to the actual pitch angle of the aircraft (inverted operation).

Relay B is provided for changing the system from one form of operation to the other and the contacts of this relay are shown in the drawing in the unoperated condition, which is the condition appropriate to normal operation. The system will first be described with relay B unoperated, that is to say, arranged for normal operation, and will then be described with relay B operated, that is to say, arranged for inverted operation. Relay B is shown as being operated by battery 25 when switch 24 is closed.

Normal operation

The primary controller comprises a pilot's manual controller 18 for setting the pitch to be maintained through the automatic control system. This controller varies the setting of a potentiometer P1 connected across supply lines 7, 8 fed from a D. C. source so that the voltage on its sliding contact constitutes the set input value for the system. The sliding contact is connected through a high-resistance resistor R1 to the live input terminal 11 of a high-gain D. C. amplifier 1 stabilized against drift in the manner described and claimed in co-pending application Serial No. 130,328 filed November 30, 1949 in the names of Hugh Brougham Sedgfield and Frederick Arthur Summerlin.

The grounded input terminal 12 of this amplifier is connected to the centre tap of a fixed potential divider P4 connected across the D. C. supply lines 7, 8 so that the input to the live terminal 11 may be either positive or negative with respect to the grounded terminal 12.

A second variable potential divider P2 connected across the D. C. supply lines is controlled by a shaft 15 connected to a gyro-vertical (not shown) so that its setting is varied in accordance with the pitch attitude of the aircraft. Thus the voltage output of this potentiometer is a measure of the pitch of the aircraft which is the variable to be governed by the system. The adjustable tapping of this potential divider is connected through a high-resistance resistor R2 and the parallel combination of capacitor C5 and resistor R6 to the live input terminal 11 of the amplifier 1. The voltage of potential divider P2 is arranged to be of such a magnitude and sense in relation to that of the variable potential divider P1 that it is equal and opposite to it when the variable has assumed the value corresponding to the set input value. These voltages constitute the primary control terms in the system and the difference between them constitutes the error signal to which the system is required to respond.

The output terminals 13, 14 of the amplifier 1 are connected to the control winding of an electromagnetic clutch 20, the input member of which is continuously rotated by an electric motor 20' and the output member of which operates through shaft 6 the control valve 22 of a hydraulic motor 23, in the manner shown in co-pending application Serial No. 104,862 filed July 15, 1949 in the names of Hugh Brougham Sedgfield, Frederick Arthur Summerlin and George Hambly Kyte, now U. S. Patent 2,644,427, issued July 7, 1953.

The arrangement is such that the hydraulic motor rotates shaft 16 at a speed that is substantially proportional to the current supplied to the electromagnetic clutch 20, and the direction of rotation of the shaft corresponds to the direction of this current. Shaft 16 operates the elevator 17 of the aircraft in such a direction as to reduce the difference between the angle set into the pitch controller 18 and the actual pitch angle of the aircraft.

The variable tapping of a third potential divider P3 is controlled by the shaft 6. This potential divider is connected across the same D. C. source as the other potential dividers mentioned above. The apparatus is so set up that in the normal position of the clutch output member when the hydraulic valve 22 is closed, the adjustable tapping is in the centre of the potential divider and is thus at earth or ground potential. When the clutch output member is displaced from its normal position, the adjustable tapping of the potential divider is no longer at earth potential, but at a potential measuring, by its magnitude and sense, the displacement of the clutch output member. This voltage is fed back to the live input terminal 11 of the amplifier through a resistor R3, capacitor C2, and the normally closed contact B3 of a relay B. The clutch output member is arranged to operate more quickly than any of the other controllers, so that the amplifier and clutch act as an electro-mechanical mixing amplifier as described and claimed in British application No. 12,389/51 now British Patent No. 724,516.

The arrangement of the system in the manner disclosed in the above-mentioned application No. 12,389/51 enables a number of terms to be mixed at the input terminals of the D. C. amplifier 1, each of the said signals being dependent on the setting of the potential divider producing it and the impedance of the connection between that potential divider and the input terminals of the amplifier, but not on the setting of any of the other potential dividers or on the impedance of any of the other connections. Consequently, it is possible to include reactive elements in any of the connections, in order to produce secondary control terms each of which is a time function of the setting of one of the potential dividers. Such secondary control terms are necessary to prevent instability and over-control, since the time constant of the whole servo loop including the aircraft is long. As an example of the production of such a secondary control term a capacitor C5 is shown connected in parallel with a resistor R6 in the connection between potential divider P2 and the amplifier. This arrangement causes the input to the amplifier to include a term that is dependent on the rate of change of the actual pitch of the craft.

A further secondary control term is produced by a fourth potential divider P5 having its variable output controlled by the displacement of the elevator 17. A voltage measuring the rate of displacement of the elevator is fed back to the input terminals of the amplifier by connecting the adjustable tapping of this potential divider to the live input terminal of the amplifier through a capacitor C4 and a resistor R5.

*Inverted operation*

At times it may be desirable for the pilot to be able to control the elevator 17 directly instead of through the automatic control system, and in this case it is desirable that, when the automatic system is again brought into action, the setting of the pilot's controller 18 should correspond to the actual pitch angle of the aircraft, in order that no violent change in this angle may be produced when control is resumed through the automatic control system. For this purpose the system is arranged for inverted operation during the stand-by period before the automatic control is resumed.

As already explained, the change-over to inverted operation is effected by closing switch 24. During inverted operation the output of the amplifier 1, instead of being connected through change-over contacts B4 to the control winding of the clutch 20 to operate the elevator 11, is applied to a transductor amplifier 19 which controls the two-phase servo-motor 3 so that it alters the setting of the pilot's controller in such a direction as to reduce the difference between the voltage on the potential divider P1 and the voltage on the potential divider P2. Thus, the system now operates to maintain the pilot's controller 18 at a setting that corresponds to the then obtaining pitch angle of the aircraft. The potential divider P3 operated by the clutch output member is disconnected by means of contacts B3 as the clutch 20 is not operated in this condition, so that there is no feed back from the output member to keep the input impedance of the amplifier low. For this reason contacts B2 close to provide electrical feed back through a resistor R4 and a capacitor C3 from the output terminals of the amplifier to its input terminals, in the manner described and claimed in British application No. 2327/48, now British Patent No. 718,171.

In an alternative embodiment the clutch is left connected in the stand-by condition and its output member is arranged to operate a valve controlling a secondary hydraulic servomotor for altering the setting of the pilot's controller. In this case the electric feed back is not required. Various other ways of changing over from normal to stand-by operation are possible and the present invention may be used in any of them.

In accordance with the invention arrangements are provided for preventing over-control and instability when the system is connected for inverted operation. For this purpose when the system is arranged for inverted operation, contacts B1 connect a capacitor C1 across resistor R1 in the input circuit leading from potential divider P1 to the live input terminal 11 of the amplifier 1. This capacitor modifies the input signal provided by potential divider P1 which is proportional to the displacement of the pilot's controller in the steady state, so that during a change of this displacement it becomes initially partly dependent on the rate of this displacement.

Further contacts B5 on the relay B may be arranged to disconnect during stand-by operation the capacitor C5 connected during manual operation between the potential divider operated by the gyro-vertical and the live input terminal of amplifier 1 so that the pilot's controller is operated in accordance with the position of the gyro-vertical and not in dependence on any time function of this position, as shown in Fig. 2.

Also, further contacts B6 may also be arranged on relay B to break the connection between potential divider P5 and the amplifier so that the operation of the system during inverted operation, is unaffected by the rate of movement of the elevator, as shown in Fig. 3.

The invention may be applied to any form of servo system arranged for alternative normal and inverted operation, and is not restricted to the particular type of servo system described. Likewise any known means may be used for modifying the control exercised by the system during inverted operation and the invention is not restricted to the particular manner of applying the modifying terms described herein, nor to the use of a modifying term that is proportional to the rate of change of the set input value.

What is claimed is:

1. A servo system for controlling a variable in accordance with the difference between the value of the variable and the value of a set input value in a normal mode of operation and for controlling the set input value in accordance with the difference between the value of the variable and the set input value in a stand-by mode of operation, means for supplying a signal corresponding to the value of the variable, means for supplying a signal corresponding to the set input value, amplifier means responsive to both of said signals for supplying an output proportional to the algebraic sum thereof, a first motor means for controlling the value of the variable, a second motor means for controlling the value of the set input value, switch means for supplying said output signal to said first motor means during the normal mode of operation in one position thereof and for supplying said output signal to said second motor means during the stand-by mode of operation in another position thereof, means responsive to said input value signal for supplying a signal proportional to the rate of change thereof, and means controlled by said switch means for further supplying said rate signal to said amplifier means during the stand-by mode of operation of said system whereby said second motor means is controlled at least in part in accordance with the rate of change of said input value.

2. An automatic control system for aircraft capable of normal and stand-by modes of operation comprising means for supplying a signal proportional to deviations in the attitude of said craft from a reference attitude, means for supplying a signal proportional to the rate of change of said attitude signal, a positionable pilot's controller for supplying a signal proportional to a desired attitude change, amplifier means responsive to all of said signals for supplying an output proportional to the algebraic sum thereof, a first motor means for controlling the attitude of said craft during the normal mode of operation of said system whereby to reduce the difference between said attitude signal and said controller signal through said aircraft, a second motor for controlling the position of said pilot's controller in the follow-up mode of operation of said system whereby to reduce the difference between said attitude signal and said controller signal through said controller, switch means for selecting the mode of operation of the system, and means controlled by said switch means for supplying said output signal to said first motor in one position thereof and for supplying said output signal to said second motor in another position thereof, a rate circuit connected to receive said controller signal for additionally supplying a signal to said amplifier proportional to the rate of change of said controller signal during the follow-up mode of operation whereby to additionally control said second motor, and means also controlled by said switch means for rendering said rate circuit ineffective during the normal mode of operation of said system.

3. An automatic control system for aircraft capable of normal and stand-by modes of operation comprising means for supplying a signal proportional to deviations in the attitude of said craft from a reference attitude, means for supplying a signal proportional to the rate of change of said attitude signal, a positionable pilot's controller for supplying a signal proportional to a desired attitude change, amplifier means responsive to all of said signals for supplying an output proportional to the algebraic sum thereof, a first motor means for controlling the attitude of said craft during the normal mode of operation of said system whereby to reduce the difference between said attitude signal and said controller signal through said aircraft, a second motor for controlling the position of said pilot's controller in the follow-up mode of operation of said system whereby to reduce the difference between said attitude signal and said controller signal through said controller, switch means for selecting the mode of operation of the system, and means controlled by said switch means for supplying said output signal to said first motor in one position thereof, and for supplying said output signal to said second motor in another position thereof, a resistance-capacitor circuit connected to receive said controller signal for additionally supplying a signal to said amplifier proportional to the rate of change of said controller signal during the follow-up mode of operation whereby to additionally control said second motor, and means also controlled by said switch means for removing said capacitor from said circuit during the normal mode of operation of said system.

References Cited in the file of this patent

UNITED STATES PATENTS

| | | |
|---|---|---|
| 2,401,168 | Kronenberger | May 28, 1946 |
| 2,415,429 | Kellogg 2nd et al. | Feb. 11, 1947 |
| 2,415,819 | Halpert et al. | Feb. 18, 1947 |
| 2,429,642 | Newton | Oct. 28, 1947 |
| 2,570,905 | Young et al. | Oct. 9, 1951 |
| 2,589,834 | MacCallum | Mar. 18, 1952 |
| 2,614,236 | Alberts | Oct. 14, 1952 |